United States Patent
Shaik et al.

(10) Patent No.: US 12,381,888 B2
(45) Date of Patent: Aug. 5, 2025

(54) SYSTEM AND METHOD FOR DERIVING NETWORK ADDRESS SPACES AFFECTED BY SECURITY THREATS TO APPLY MITIGATIONS

(71) Applicant: Citrix Systems, Inc., Fort Lauderdale, FL (US)

(72) Inventors: Saifulla Shaik, Nellore (IN); Aikaterini Kalou, Patras (GR); Stuart Kennedy, Galston (AU)

( * ) Notice: Subject to any disclaimer, the term of this patent is extended or adjusted under 35 U.S.C. 154(b) by 732 days.

(21) Appl. No.: 17/541,923

(22) Filed: Dec. 3, 2021

(65) Prior Publication Data
US 2023/0147714 A1    May 11, 2023

Related U.S. Application Data

(63) Continuation of application No. PCT/GR2021/000065, filed on Nov. 5, 2021.

(51) Int. Cl.
*H04L 9/40* (2022.01)

(52) U.S. Cl.
CPC ...... *H04L 63/1408* (2013.01); *H04L 63/1433* (2013.01); *H04L 63/1441* (2013.01); *H04L 63/18* (2013.01); *H04L 63/20* (2013.01)

(58) Field of Classification Search
CPC ............. H04L 63/1408; H04L 63/1433; H04L 63/1441; H04L 63/18; H04L 63/20; H04L 63/0209; H04L 63/1416; G06F 21/554
See application file for complete search history.

(56) References Cited

U.S. PATENT DOCUMENTS

| | | | |
|---|---|---|---|
| 10,609,063 B1 * | 3/2020 | Oliphant | G06F 21/50 |
| 10,951,660 B2 * | 3/2021 | Rogers | H04L 63/06 |
| 11,770,388 B1 * | 9/2023 | Laconic | H04L 67/12 726/23 |
| 2013/0268994 A1 * | 10/2013 | Cooper | H04L 63/10 726/1 |
| 2014/0283085 A1 * | 9/2014 | Maestas | H04L 63/1433 726/25 |
| 2017/0214709 A1 * | 7/2017 | Maestas | H04L 63/1433 |
| 2017/0264644 A1 * | 9/2017 | Mihan | H04L 63/1441 |
| 2017/0366572 A1 * | 12/2017 | King-Wilson | H04L 63/1433 |

(Continued)

FOREIGN PATENT DOCUMENTS

| | | | | |
|---|---|---|---|---|
| WO | WO-2016199125 A1 * | 12/2016 | | G06F 21/55 |
| WO | WO-2022101910 A1 * | 5/2022 | | H04L 63/102 |
| WO | WO-2022215070 A1 * | 10/2022 | | H04L 61/4511 |

OTHER PUBLICATIONS

International Search Report and Written Opinion on PCT Appln PCT/GR2021/000065 dated Jun. 28, 2022.

*Primary Examiner* — Sarah Su

(57) ABSTRACT

Described embodiments provide systems and methods for generating a network space to perform mitigation actions on a plurality of users. At least one server may determine a plurality of users of one or more levels of riskiness in a network environment, and network locations of the users. Using a plurality of clustering features, the at least one server may generate a network space comprising a cluster of network locations corresponding to a subset of the users of at least a defined level of riskiness. The at least one server may perform a mitigation action on the subset of users corresponding to the generated network space.

20 Claims, 12 Drawing Sheets

(56) References Cited

U.S. PATENT DOCUMENTS

| | | | |
|---|---|---|---|
| 2018/0027006 A1* | 1/2018 | Zimmermann | H04L 63/0227 |
| | | | 726/11 |
| 2018/0255084 A1* | 9/2018 | Kotinas | H04L 63/1425 |
| 2022/0272115 A1* | 8/2022 | McParland | G06N 5/01 |
| 2024/0394379 A1* | 11/2024 | Gorelik | G06F 21/577 |

* cited by examiner

SYSTEM AND METHOD FOR DERIVING NETWORK ADDRESS SPACES AFFECTED BY SECURITY THREATS TO APPLY MITIGATIONS

CROSS-REFERENCE TO RELATED APPLICATION

This application is a continuation of and claims priority to International Application No. PCT/GR2021/000065, titled "SYSTEM AND METHOD FOR DERIVING NETWORK ADDRESS SPACES AFFECTED BY SECURITY THREATS TO APPLY MITIGATIONS," and filed on Nov. 5, 2021, the contents of all of which are hereby incorporated herein by reference in its entirety for all purposes.

FIELD OF THE DISCLOSURE

The present application generally relates to protecting components of a network from malicious entities, including but not limited to systems and methods for generating a network space comprising one or more users to apply mitigation actions.

BACKGROUND

Certain users or components of a network are vulnerable to malicious actions by other users of the network (e.g., malicious entities). Current approaches monitor the activity or actions of the users of the network to determine a risk for each user. The risk can be used to determine whether an individual user is likely to be a malicious entity. If an individual user is determined to be a malicious entity, security techniques are employed to reduce the risk in the network.

SUMMARY

This Summary is provided to introduce a selection of concepts in a simplified form that are further described below in the Detailed Description. This Summary is not intended to identify key features or essential features, nor is it intended to limit the scope of the claims included herewith.

The systems and methods discussed herein may generate, define and/or determine a network space comprising a cluster of network locations corresponding to a subset of users in a network environment. Current approaches for reducing a level of risk of a particular system or network (e.g., for identifying a potentially malicious entity of the system/network) can apply and/or perform a mitigation action on a single user at a time. As such, in an event of a security breach and/or security threat, current approaches are unable to perform a mitigation action (e.g., an action that eliminates a threat and/or initiates a data collection for monitoring) on a group of users or devices that are potentially impacted by malicious entities. In contrast, the systems and methods presented herein may perform at least one mitigation action (e.g., logging off a user, recording a session of the user, and/or other actions) in a subset of users (rather than a single user at a time) based on the generated network space.

In one aspect, the present disclosure is directed to a method for generating, creating, defining, and/or determining at least one network space to perform mitigation actions on a plurality of users associated with a level of risk. The method can include determining, by at least one server, a plurality of users of one or more levels of riskiness in a network environment, and network locations of the users. Using a plurality of clustering features, the at least one server may generate a network space comprising a cluster of network locations corresponding to a subset of the users of at least a defined level of riskiness. The at least one server may perform a mitigation action on the subset of users corresponding to the generated network space.

In certain embodiments, the at least one server may limit a size of a contiguous address space that forms the network space. In some embodiments, the at least one server may generate a plurality of network spaces corresponding to subsets of users of different levels of riskiness. In certain embodiments, the plurality of clustering features may include at least one of: analytics data, external threat data, user activity data, network metadata, risk scores of the users, or network performance data. The network metadata may include information of at least one of: a private network, a public network, an internet service provider, reputation or location, associated with at least one of the users. The information of the location may include at least one of: a country, a city, a region, a longitude, a latitude, a geographic indicator, a network address, a subnet identifier, or an internet protocol address. In some embodiments, performing the mitigation action may comprise at least one of: analyzing a threat associated with the subset of users, applying at least one policy to the subset of users, performing an audit on the subset of users, logging off subset of users, or recording sessions of subset of users. In certain embodiments, the at least one server may correlate information from at least some of the plurality of clustering features. In some embodiments, when at least some of the users are in public network space, the plurality of clustering features may include information on geographic location.

In one aspect, the present disclosure is directed to a system comprising at least one processor. The at least one processor may be configured to determine a plurality of users of one or more levels of riskiness in a network environment, and network locations of the users. The at least one processor may be configured to generate, using a plurality of clustering features, a network space comprising a cluster of network locations corresponding to a subset of the users of at least a defined level of riskiness. The at least one processor may be configured to perform a mitigation action on the subset of users corresponding to the generated network space.

In certain embodiments, the at least one processor may be configured to limit a size of a contiguous address space that forms the network space. In some embodiments, the at least one processor may be configured to generate a plurality of network spaces corresponding to subsets of users of different levels of riskiness. In certain embodiments, the plurality of clustering features may include at least one of: analytics data, external threat data, user activity data, network metadata, risk scores of the users, or network performance data. The network metadata may include information of at least one of: a private network, a public network, an internet service provider, reputation or location, associated with at least one of the users. The information of the location may include at least one of: a country, a city, a region, a longitude, a latitude, a geographic indicator, a network address, a subnet identifier, or an internet protocol address. In some embodiments, the mitigation action may include at least one of: analyzing a threat associated with the subset of users, applying at least one policy to the subset of users, performing an audit on the subset of users, logging off subset of users, or recording sessions of subset of users. In certain embodiments, the at least one processor may be configured to correlate information from at least some of the plurality of clustering features. In some embodiments, when at least some of the users are in public network space, the plurality of clustering features may include information on geographic location.

In one aspect, the present disclosure is directed to a non-transitory computer readable medium storing program instructions. The program instructions stored in a non-transitory computer readable medium may cause at least one processor to determine a plurality of users of one or more levels of riskiness in a network environment, and network locations of the users. The program instructions may cause the at least one processor to generate, using a plurality of clustering features, a network space comprising a cluster of network locations corresponding to a subset of the users of at least a defined level of riskiness. The program instructions may cause the at least one processor to perform a mitigation action on the subset of users corresponding to the generated network space. In certain embodiments, the plurality of clustering features may include at least one of: analytics data, external threat data, user activity data, network metadata, risk scores of the users, or network performance data.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1A:
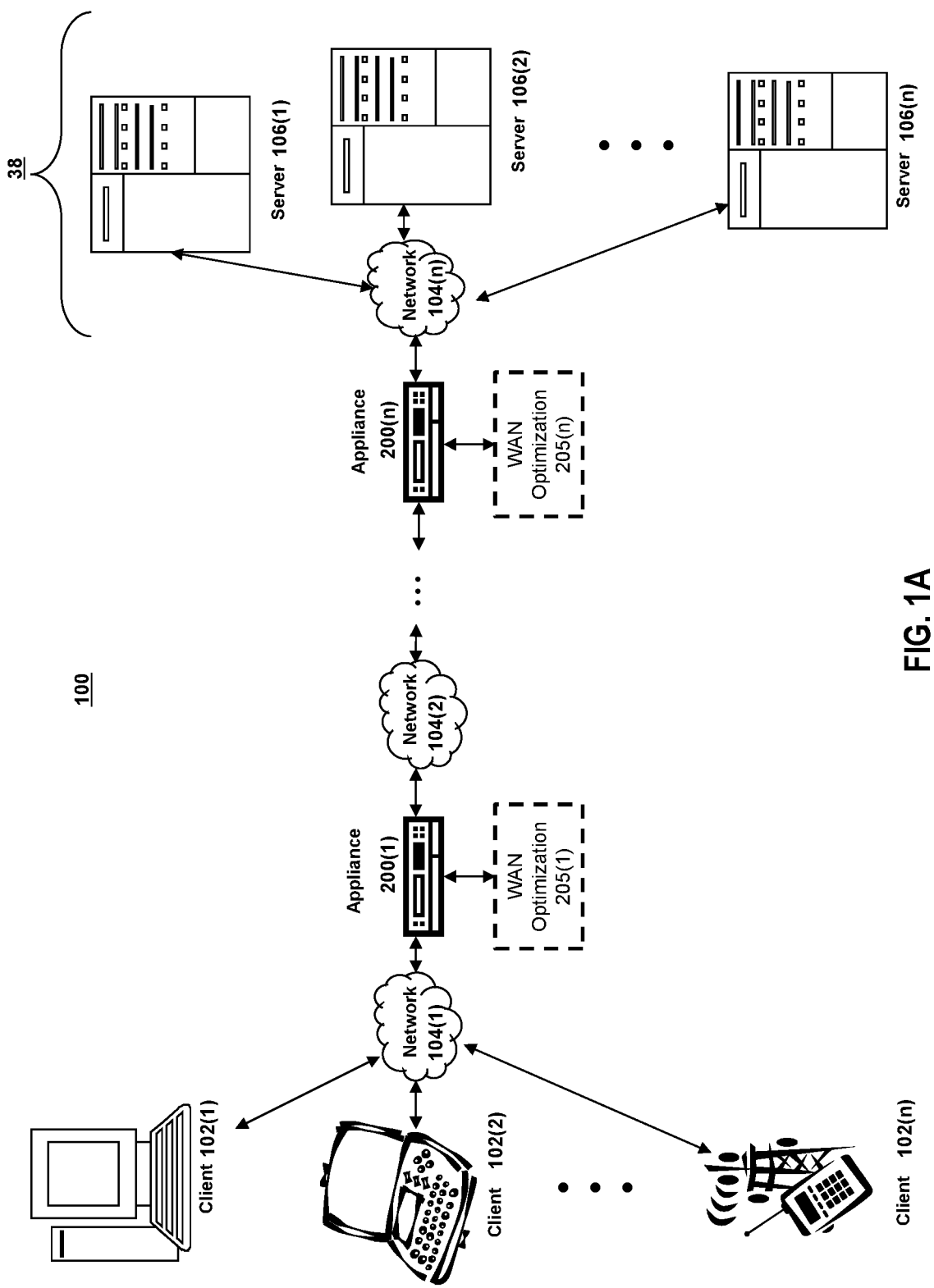
FIG. 1A is a block diagram of a network computing system, in accordance with an illustrative embodiment.

Certain users or components of a network are vulnerable to malicious actions by other users/entities of the network (e.g., malicious entities). Some approaches may monitor or track the activity and/or other aspects of the users of the network to generate risk indicators for each user. For instance, an analytics service may determine, generate and/or configure risk indicators for a particular user according to the activity of the user, a location of the user, network metadata (e.g., internet protocol (IP) metadata) of the user, a type of device (e.g., a mobile device, a laptop, a desktop computer, and/or other types of devices) of the user, and/or other information associated with the user. The generated risk indicators may be used to determine whether an individual user is likely to be a risky user, e.g., a user at risk from or to be exploited by a malicious entity (e.g., due to the user's behavior or situation) or that is a malicious entity. If an individual user is determined to be a risky user (e.g., based on the risk indicator of the user), pre-configured actions (or manual actions) for reducing a level of risk within the network are applied to the individual user (e.g., applied to the endpoint).

Current approaches for reducing a level of risk of a particular system or network (e.g., for identifying a potentially malicious entity of the system/network) can apply and/or perform a mitigation action on a single user at a time. As such, in an event of a security breach and/or security threat, current approaches are unable to perform a mitigation action (e.g., an action that eliminates a threat and/or initiates a data collection for monitoring) on a group of users that are potentially risky or at risk.

The systems and methods discussed herein may generate, define and/or determine a network space comprising a cluster of network locations corresponding to a subset of users in a network environment. As such, at least one mitigation action (e.g., logging off a user, recording a session of the user, and/or other actions) may be applied to (or performed on) a subset of users (rather than a single user at a time) based on the network space. In certain embodiments, the network space may be determined according to (or by using) one or more statistical approaches and/or machine learning approaches.

In a private network environment, for example a network environment of a corporate organization, a plurality of users can be connected to a private network. For instance, the plurality of users may be externally connected to the private network via a plurality of public IP addresses. As such, performing a mitigation action on the plurality of users connected via the plurality of public IP addresses may impact the operation of the corporate organization, for example. In certain embodiments, a mitigation action can be applied on a derived private IP address space (e.g., a network space) by correlating the risk scores of the user with the IP addresses of the users. In one example regarding a particular branch of the corporate organization, a group of users within the branch can be monitored, tracked or supervised in an event of a security breach within the corporate network. As such, the system and methods described herein may obtain or acquire information associated with the group of users to perform an analysis (e.g., a focused root cause analysis) on a subset of the users of at least a defined level of riskiness. Based on the risk indicators (e.g., a user risk categorization) of the users, an IP reputation associated with the users, and/or a type of identified risk/threat, the network space (e.g., an address space) can be updated, adjusted and/or modified according to the different outcomes of a threat analysis (e.g., different outcomes may entail particular mitigation actions).

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for generating a network space comprising one or more users to perform mitigation actions.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, FL.

Figure 1B:
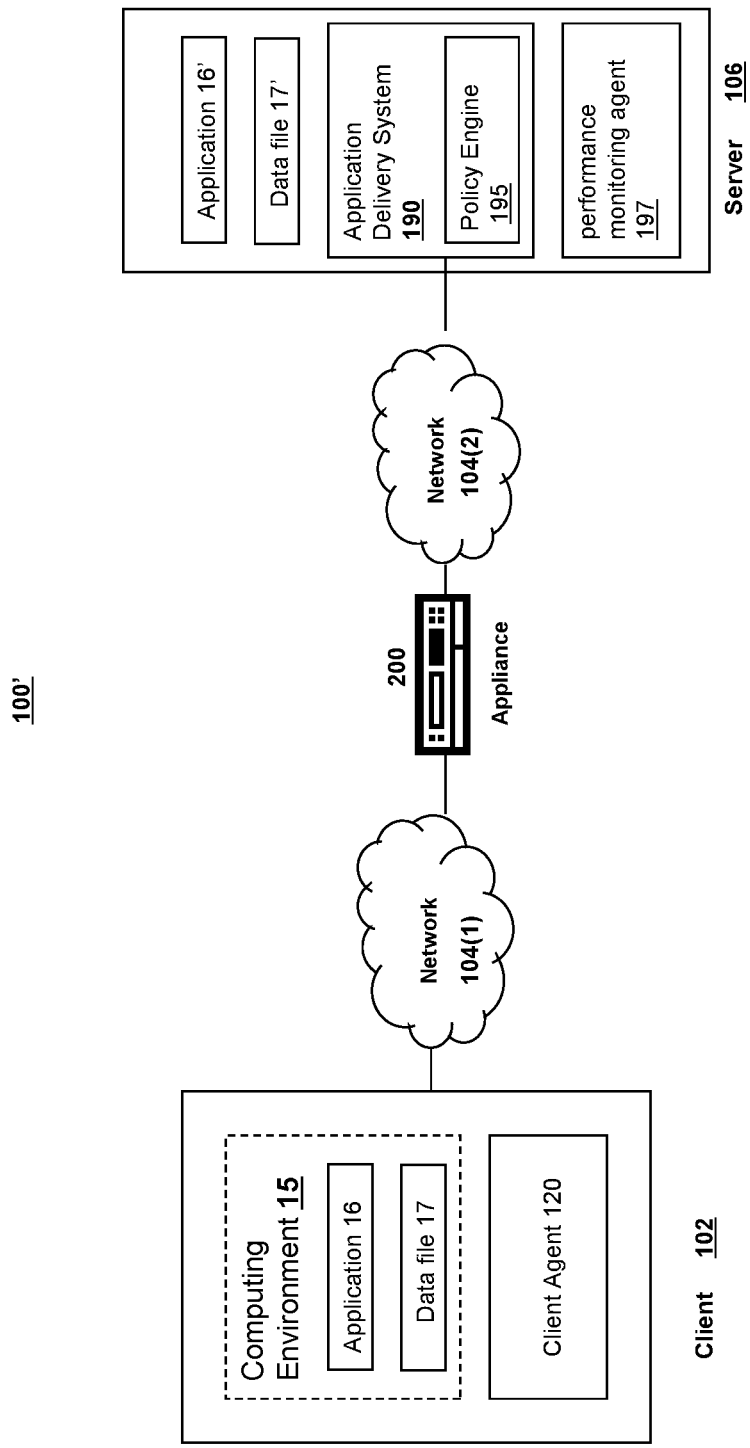
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file (e.g., application 16' and data file 17') from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
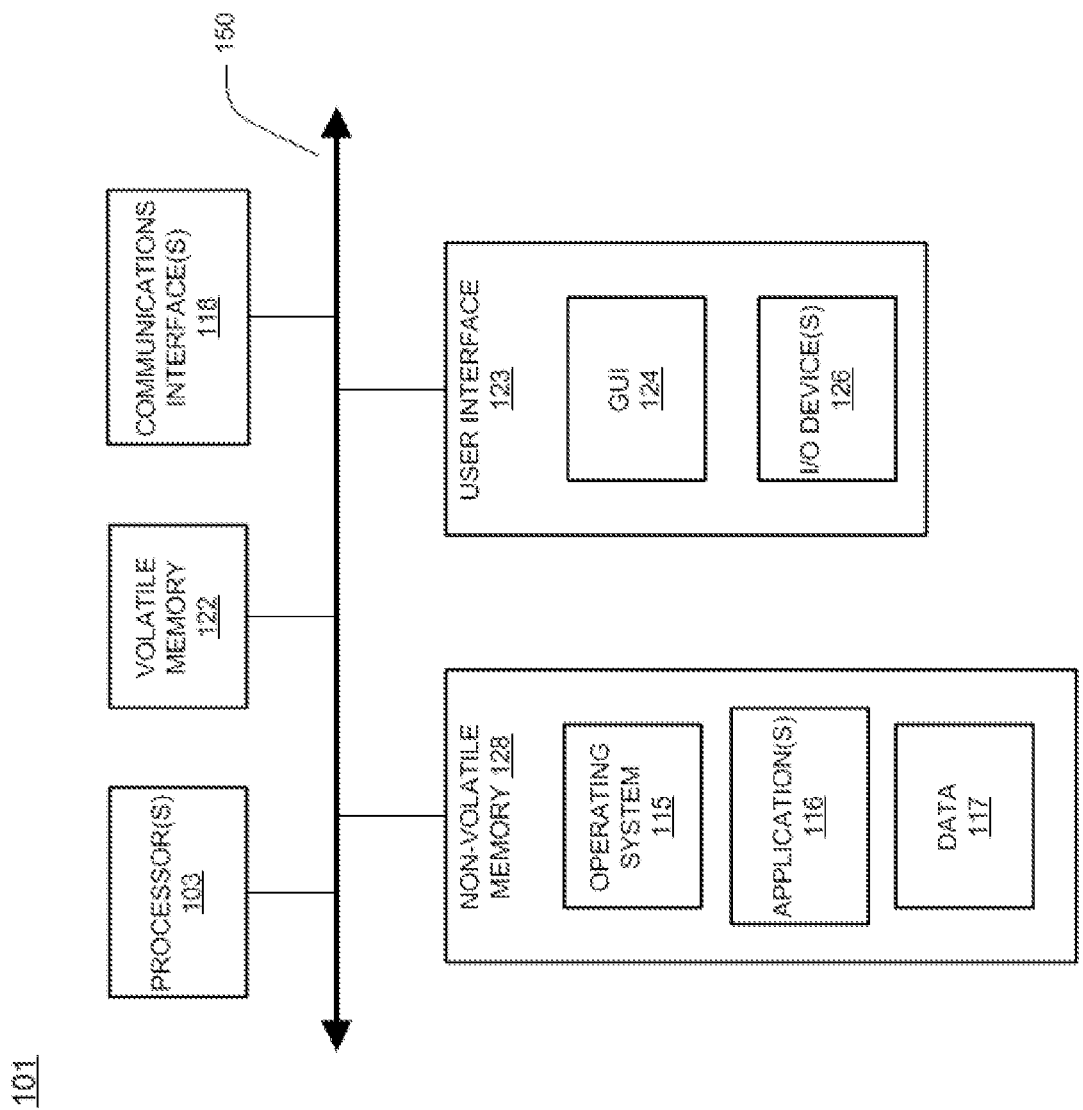
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, FL, the teachings of which are hereby incorporated herein by reference.

Figure 1D:
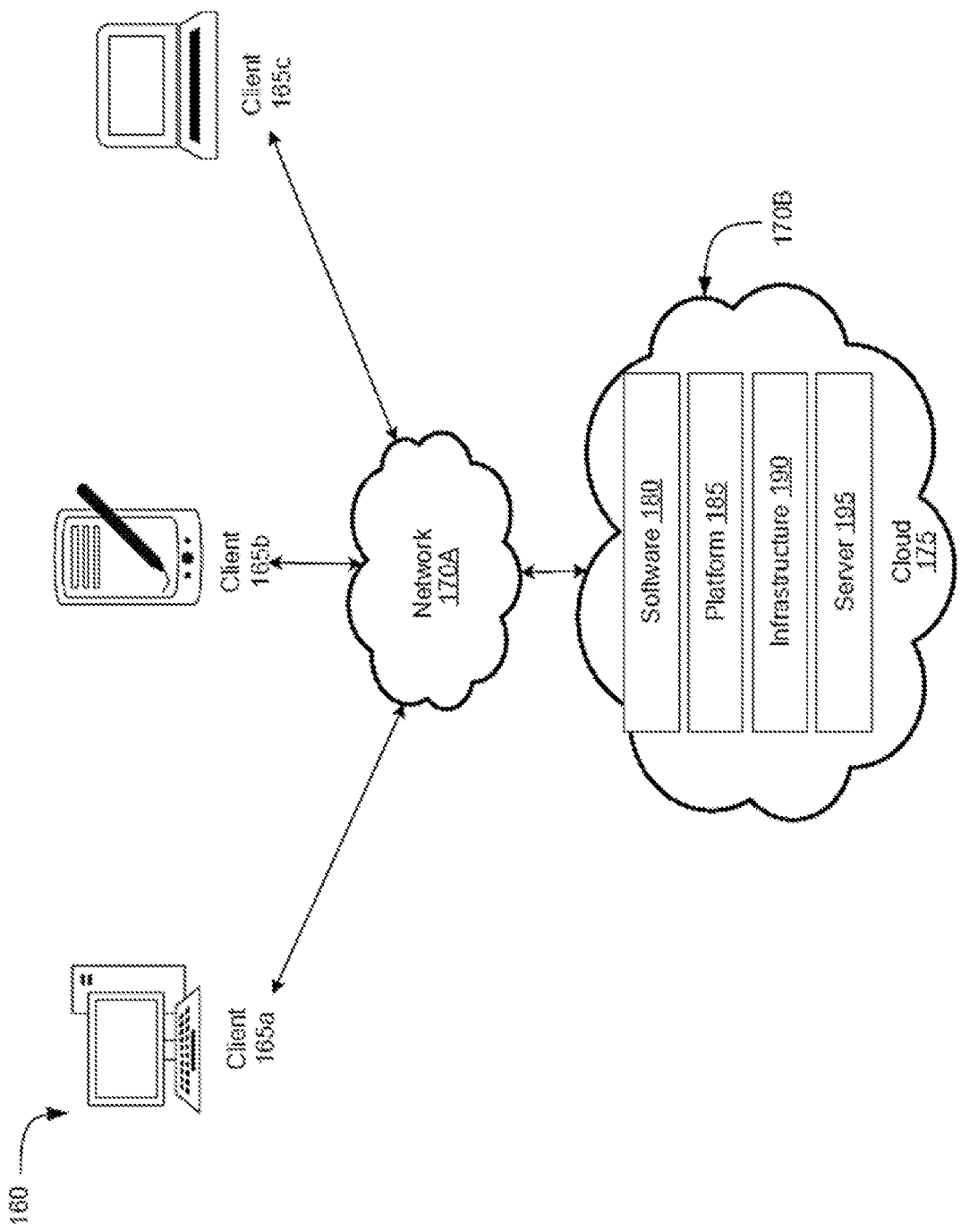
FIG. 1D is a block diagram depicting a computing environment comprising client device in communication with cloud service providers, in accordance with an illustrative embodiment.

Referring to FIG. 1D, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 165 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1C.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Appliance Architecture

Figure 2:
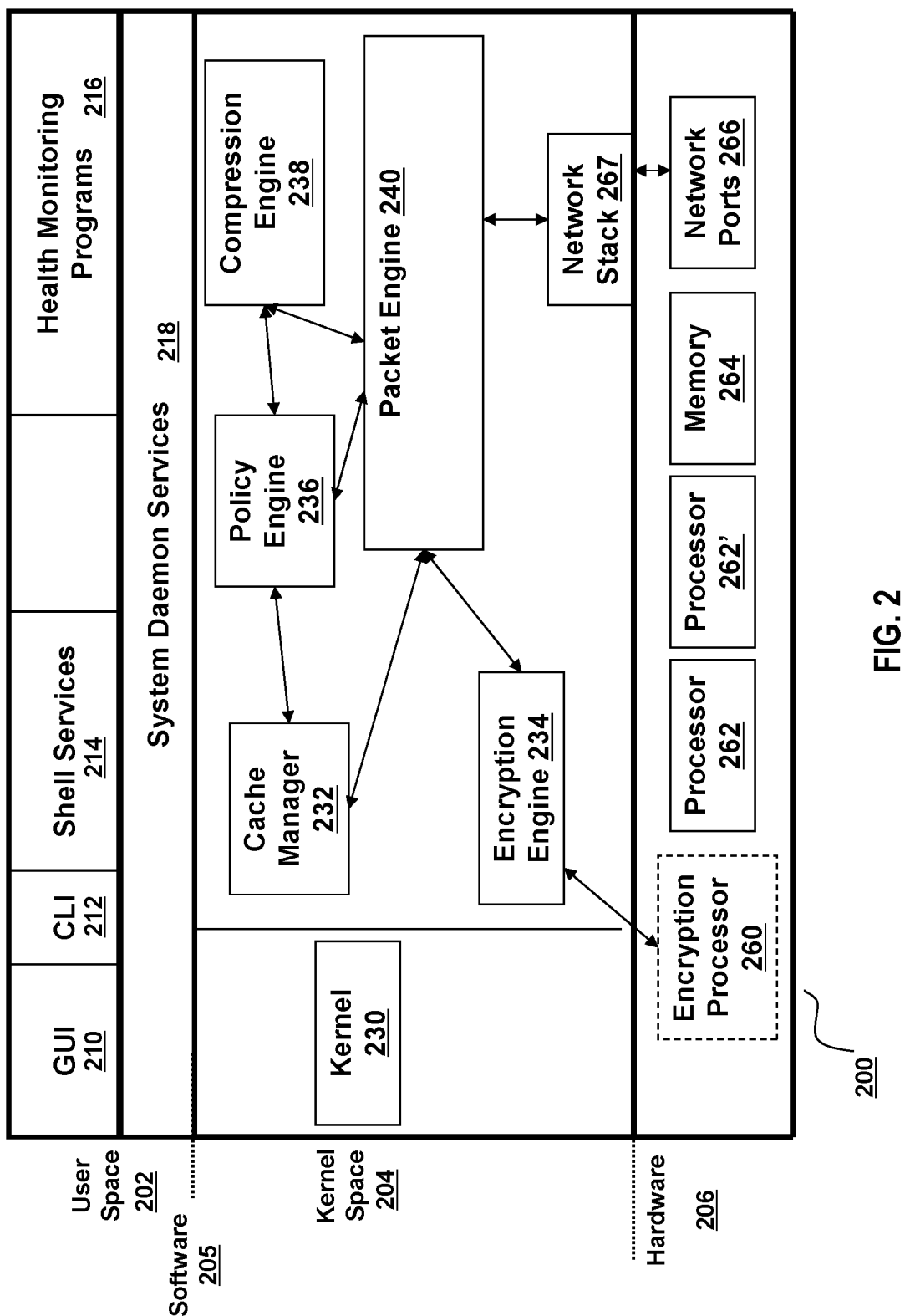
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, FL. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, FL, the teachings of which are hereby incorporated herein by reference.

C. Systems and Methods for Generating a Network Space to Perform Mitigation Actions In certain approaches, an analytics service (or other services for detecting, analyzing, and responding to security threats across a network environment) may obtain and/or acquire network data (e.g., public IP data and/or private IP data), user location data, user device data, user time information and/or other types of user data/information to generate (e.g., statistically determine) risk indicators associated with each user of a network environment. The risk indicator can specify and/or indicate whether a particular user is performing an unusual and/or risky action, behavior and/or performance, such as an unusual geo-location access to the network environment, a network access from a new device, a potential brute force detection, and/or other unusual actions. If a particular user is associated with an unusual or risky action, the analytics service can perform or apply a pre-configured mitigation action on the user. For instance, the analytics service can log-off the user and/or record the user's session. In one example, an administrator can manually specify the mitigation action(s) to be applied to the user. For instance, the administrator can determine to analyze a determined risk indicator in the context of a user environment, and/or the history of the user.

Figure 3:
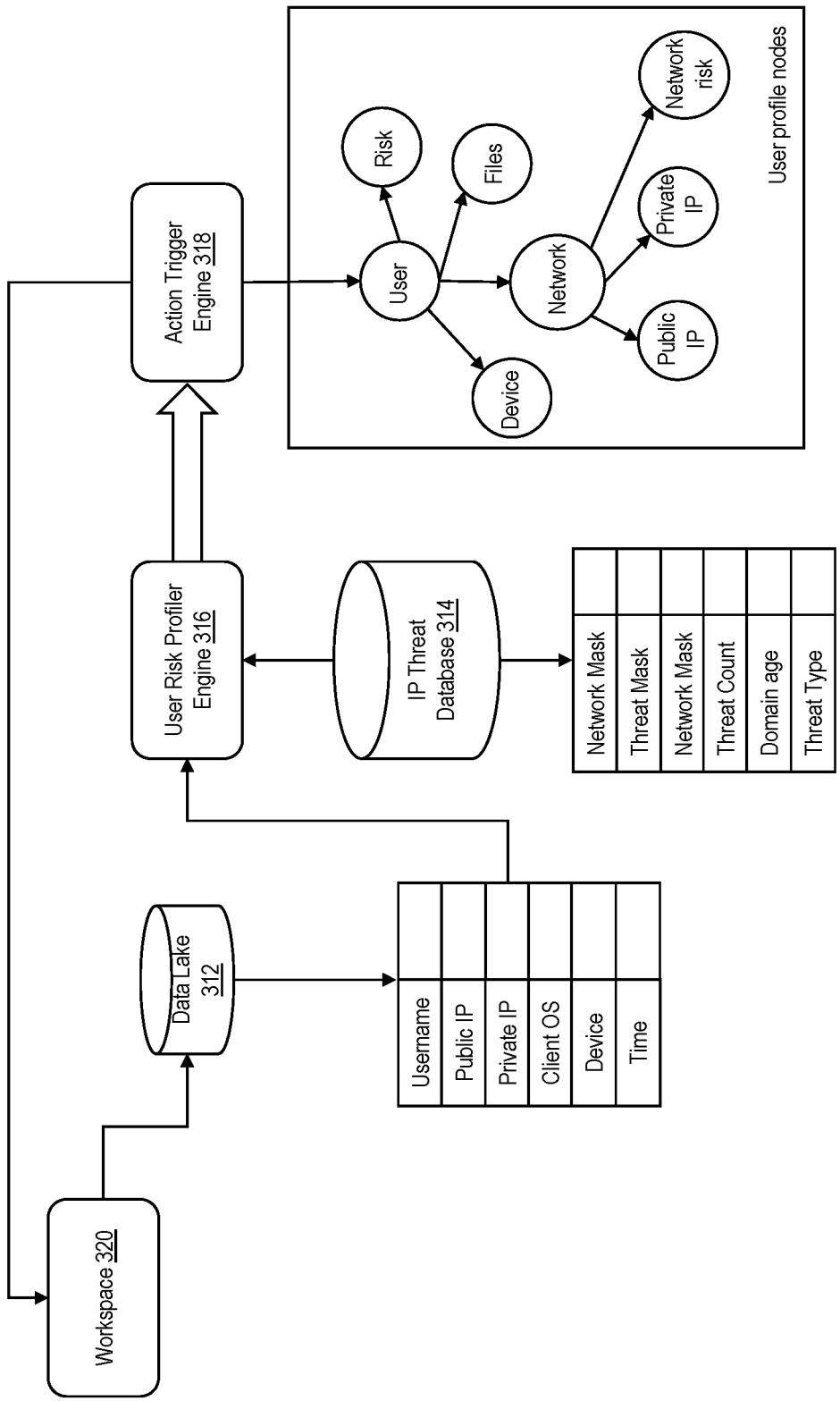
FIG. 3 is a block diagram of a system for performing a mitigation action on a single user according to a determined level of riskiness, in accordance with an illustrative embodiment.

In view of the above discussion regarding determining a level of riskiness of a user in a network environment, a process and/or system for determining said level of riskiness may be beneficial, as further explained in the following passages. Referring to FIG. 3, depicted is a block diagram of one example embodiment of a system 300 for determining a level of riskiness of a user in a network environment, and performing a mitigation action on a single user according to the determined level of riskiness. The system 300 may include one or more data lakes 312 (e.g., data pools/containers/repositories, or collections of data), one or more IP threat databases 314, at least one user risk profiler engine 316 and/or at least one action trigger engine 318. The one or more data lakes 312 may be configured and/or designed to store data in its natural or raw format. For instance, the data lake(s) 312 can store and/or maintain raw data associated with one or more users of the network environment, such as a username of the user, a public IP address of the user, a private IP address of the user, an operating system (OS) of a client of the user, a type of device (e.g., client device) of the user, and/or other information associated with a user. As depicted in FIG. 3, a plurality of data/information associated with the user(s) can be obtained from a plurality of clients 102 (e.g., clients of users of the network environment) via a workspace 320, for example. The workspace 320 can be designed and/or configured to access programs, files, and/or services from a variety of sources through a central application (or a browser).

Each of the elements or entities of FIG. 3 is implemented in hardware, or a combination of hardware and software, in one or more embodiments. Each component of the system 300 may be implemented using hardware or a combination of hardware or software detailed above in connection with FIG. 1C. For instance, each of these elements or entities can include any application, program, library, script, task, service, process or any type and form of executable instructions executing on hardware of a client device 102, a server 106 and/or a network device 200 in connection with FIGS. 1B-1C, for instance. The hardware includes circuitry such as one or more processors in one or more embodiments.

In certain embodiments, the user risk profiler engine 316 can be designed and/or configured to determine a level of riskiness of a user, for example, by determining and/or generating risk indicators. In some embodiments, a level of riskiness can be defined and/or characterized according to a plurality of levels (e.g., a first level, a second level, a third level and/or other levels). In one example, a first level of riskiness may indicate that the user does not represent an imminent security threat to the network environment. A second level of riskiness, for instance, may specify that the user is likely to be a malicious entity (and/or is vulnerable to an attack), and therefore, the security of the network environment may be compromised. In another example, a third level of riskiness can indicate that the user is a malicious entity (and/or is highly vulnerable to an attack by a malicious entity), such that one or more security attacks have been performed (e.g., by the user) within the network environment.

In some embodiments, the user risk profiler engine 316 may determine/generate the risk indicator(s) (e.g., for each user) based on (or by using) the data/information stored in the data lake 312. For instance, the user risk profiler 316 may correlate data/information of the data lake 312 with historical data of the user and/or data stored in the IP threat database 314 (e.g., external network threat intelligence), to determine a risk indicator of a user. The one or more IP threat databases 314 may be configured and/or designed to store external threat data regarding one or more IP addresses associated with external connections to the network environment. The external threat data, for example, can include at least one of a network mask, a threat mask, an IP status, a threat count, a domain age, a threat type, and/or other types of data. In certain embodiments, the user risk profiler engine 316 may determine/generate the risk indicator(s) according to (or by applying) machine learning approaches, for instance. In one example, the user risk profiler engine 316 may use, apply and/or perform a machine learning approach to learn and/or determine one or more normal (e.g., typical and/or usual) patterns of a user, such as a normal activity pattern of a user, a normal network access pattern of a user, a normal file access pattern of a user, and/or other patterns or behaviors that define a normal/usual/expected behavior of the user. If a known user is suddenly associated with an anomalous pattern (e.g., anomalous network access pattern detected by the user risk profiler engine 316), the user risk profiler engine 316 may determine one or more risk indicator(s) that specify a level of riskiness of the user (e.g., a high level of risk). Responsive to determining a level of riskiness of the user, at least one mitigation action can be performed on a single user. As such, an action trigger engine 318 may be designed and/or configured to perform mitigation actions on users, according to a determined level of riskiness (e.g. according to risk indicators determined by the user risk profiler engine 316).

Figure 4:
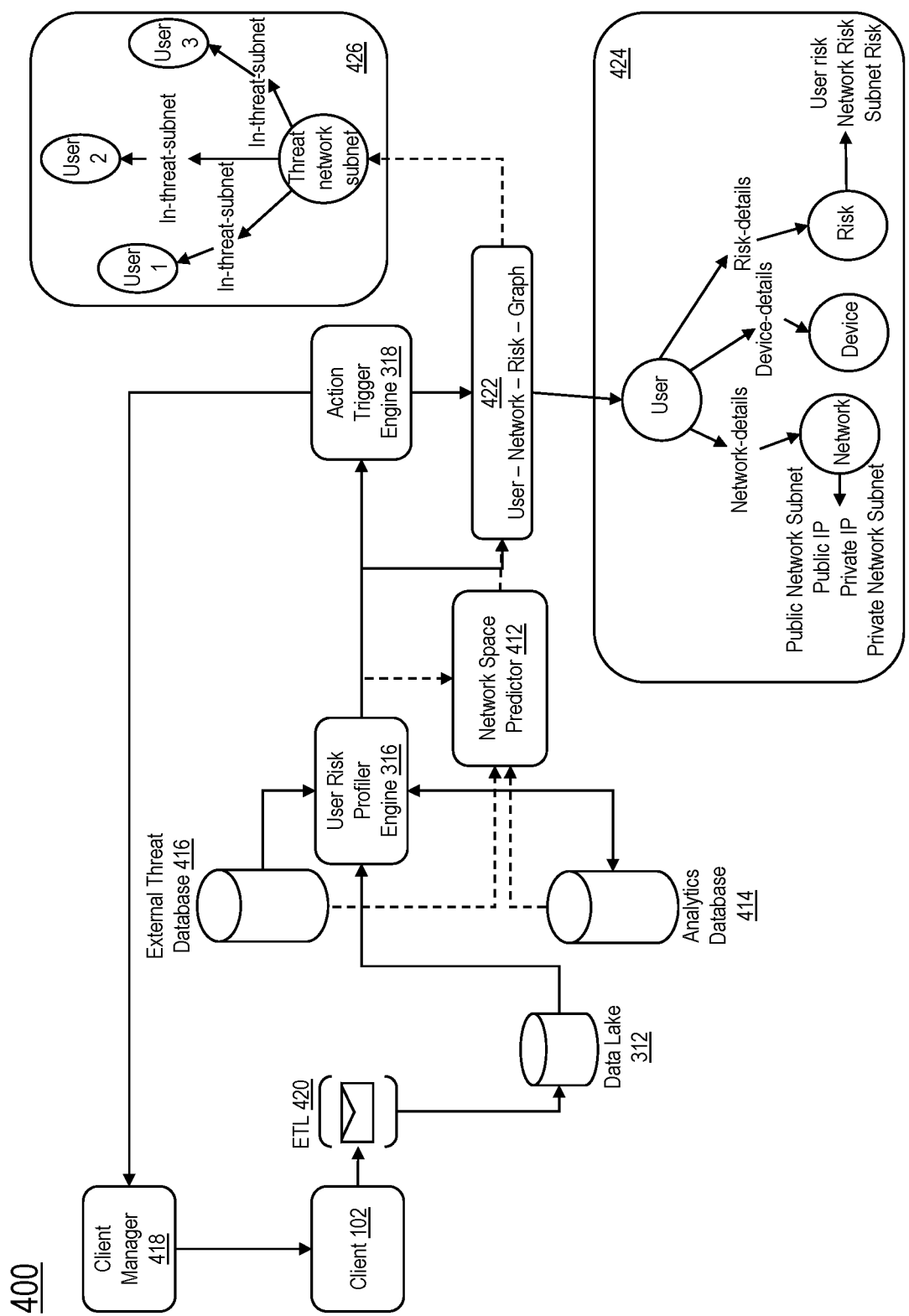
FIGS. 4-5 are block diagrams of systems for performing a mitigation action on a subset of users of at least a defined level of riskiness, in accordance with illustrative embodiments.

The systems and methods discussed herein can improve upon the system described in FIG. 3 by incorporating a network space predictor 412 into the system. Referring to FIG. 4, depicted is a block diagram of one example embodiment of a system 400 for performing at least one mitigation action on a subset of users of at least a defined level of riskiness. The network space predictor 412 may be configured and/or designed to generate, configure, determine and/or define a network space. The network space may comprise a cluster of network locations corresponding to one or more users. The one or more users can be a subset of users of a plurality of users of one or more levels of riskiness. As such, prior to generating the network space, the network space predictor 412 may determine and/or identify the plurality of users and/or the network locations of said users. In some embodiments, the data lake 312, user risk profiler engine 316 and/or action trigger engine 318 of FIG. 4 may include one or more features of the data lake 312, user risk profiler engine 316 and/or action trigger engine 318 of FIG. 3, respectively.

Each of elements or entities in FIG. 4 is implemented in hardware, or a combination of hardware and software, in one or more embodiments. Each component of the system 400 may be implemented using hardware or a combination of hardware or software detailed above in connection with FIG. 1C. For instance, each of these elements or entities can include any application, program, library, script, task, service, process or any type and form of executable instructions executing on hardware of a client device 102, a server 106 and/or a network device 200 in connection with FIGS. 1B-1C, for instance. The hardware includes circuitry such as one or more processors in one or more embodiments.

In certain embodiments, the network space predictor 412 may generate metadata of a network space (e.g., network space comprising one or more network locations) of at least a defined level of riskiness. The network space predictor 412 can determine said metadata (or the network space itself) by correlating information associated with users of the network environment, such as historical risk indicators of the user(s), a level of riskiness of the user(s), and/or one or more IP addresses associated with the user(s). In certain embodiments, the network space predictor 412 can determine a network space that includes one or more users of at least a defined level of riskiness (e.g., exploited or potentially exploited users). Furthermore, the network space predictor 412 can adjust, fine-tune, or otherwise modify the determined network space to address one or more criteria (e.g., organization security criteria). In some embodiments, the action trigger engine 318 may be designed and/or configured to perform mitigation actions on the users corresponding to the generated network space. As such, the action trigger engine 318 may use the network space to perform one or more mitigation actions on a plurality of users of the network space (rather than on a single user).

In certain embodiments, the user risk profiler engine 316 of FIG. 4 can identify a public network access to a corporate network space. For instance, said user risk profiler engine 316 may identify the public network access based on (or by using) information of a corporate internet service provider (ISP) network space. In some embodiments, the user risk profiler engine 316 (and/or the network space predictor 412) may determine and/or generate one or more network spaces for a public network by correlating one or more features of users in close proximity, such as an IP reputation, a user risk score, a location of a user, a time of an activity, a number of detected threats and/or a user history.

In some embodiments, the user risk profiler engine 316 may determine and/or generate risk indicators for users of the network environment (e.g., associated with a level of riskiness of each user), according to a plurality of clustering features. The plurality of clustering features may include at least one of analytics data, external threat data, user activity data, network metadata (e.g., IP metadata), risk scores of the users, network performance data, and/or other types of data. The user activity data may include data of a user, such as an IP address, a device identifier (e.g., "DeviceId"), operating system (OS) information (e.g., "OSName", "OSVersion", and/or "OSExtraInfo"), browser information (e.g., "BrowserMajorVersion" and/or "BrowserMinorVersion"), location information (e.g., "GeoCity" and/or "GeoCountry"), server information (e.g., "SessionServerName", SessionUserName", and/or "SessionLaunchType"), application information (e.g., SaaS application, SaaS application URL, and/or other information), clipboard information (e.g., Clipboard Details Format Type, Clipboard Operation, Clipboard Details Format Size, Clipboard Details Result, Clipboard Details Initiator, Browser, and/or SaaS App URL), file download information (e.g., Browser, Download File Path, Domain, Download Device Type, Download File Name, and/or Download File Size), printing information (e.g., Print File Name, Browser, SaaS App Name, SaaS App URL, Printer Name, Print File Format, and/or Print File Size) and/or session information (e.g., App Name, Domain, Session Launch Type, Session User Name, and/or Session Server Name).

The network metadata includes information associated with at least one user, wherein said information can include at least one of: a private network, a public network, an internet service provider, a reputation and/or a location. The information of the location may include at least one of: a country, a city, a region, a longitude, a latitude, a geographic indicator, a network address, a subnet identifier, and/or an internet protocol address. In one example, the information of the location may include/indicate/identify a continent, a country code, a country confidence factor, a state, a state code, a state confidence factor, a city confidence factor, a postal code, a postal code confidence factor, a time zone, an area code, a designated market area (DMA), a metropolitan statistical area (MSA), a Geo names identifier, a connection type, a line speed, and/or an IP routing type. In certain embodiments, a risk score of a user can be determined based on risky behavior(s) associated with the user. The risk score can indicate and/or specify a level of risk that a user poses to an organization during a time period. In one example, a higher risk score may be associated with a high level of risk (e.g., users have acted in a risky manner or presented risky behavior), while a lower risk score can be associated with a low level of risk (e.g., users who have none or few violations on an account). The risk score may include or correspond to a dynamic value that varies and/or changes according to a behavior of the user. In certain embodiments, the risk score can be used to classify a user according to one or more categories. The one or more categories can include a high risk user (e.g., users with a risk score between 90 and 100), a medium risk user (e.g., users with a risk score between 70 and 89), a low risk user (e.g., users with a risk score between and 69), and/or a user with zero risk (e.g., users with a risk score of 0).

Figure 7:
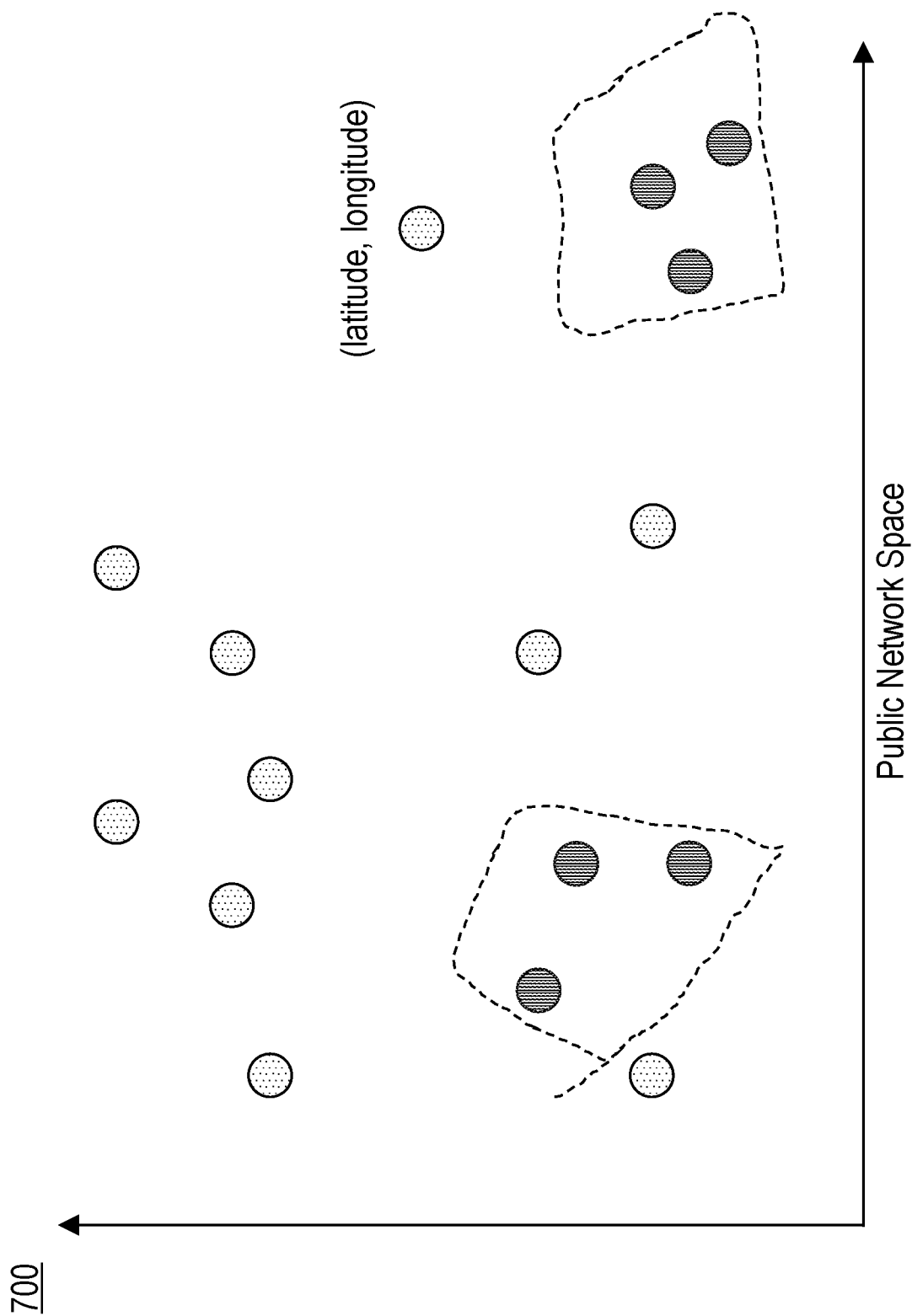
FIGS. 7-8 are diagrams of example representations of public networks and private networks, in accordance with illustrative embodiments.
Figure 8:
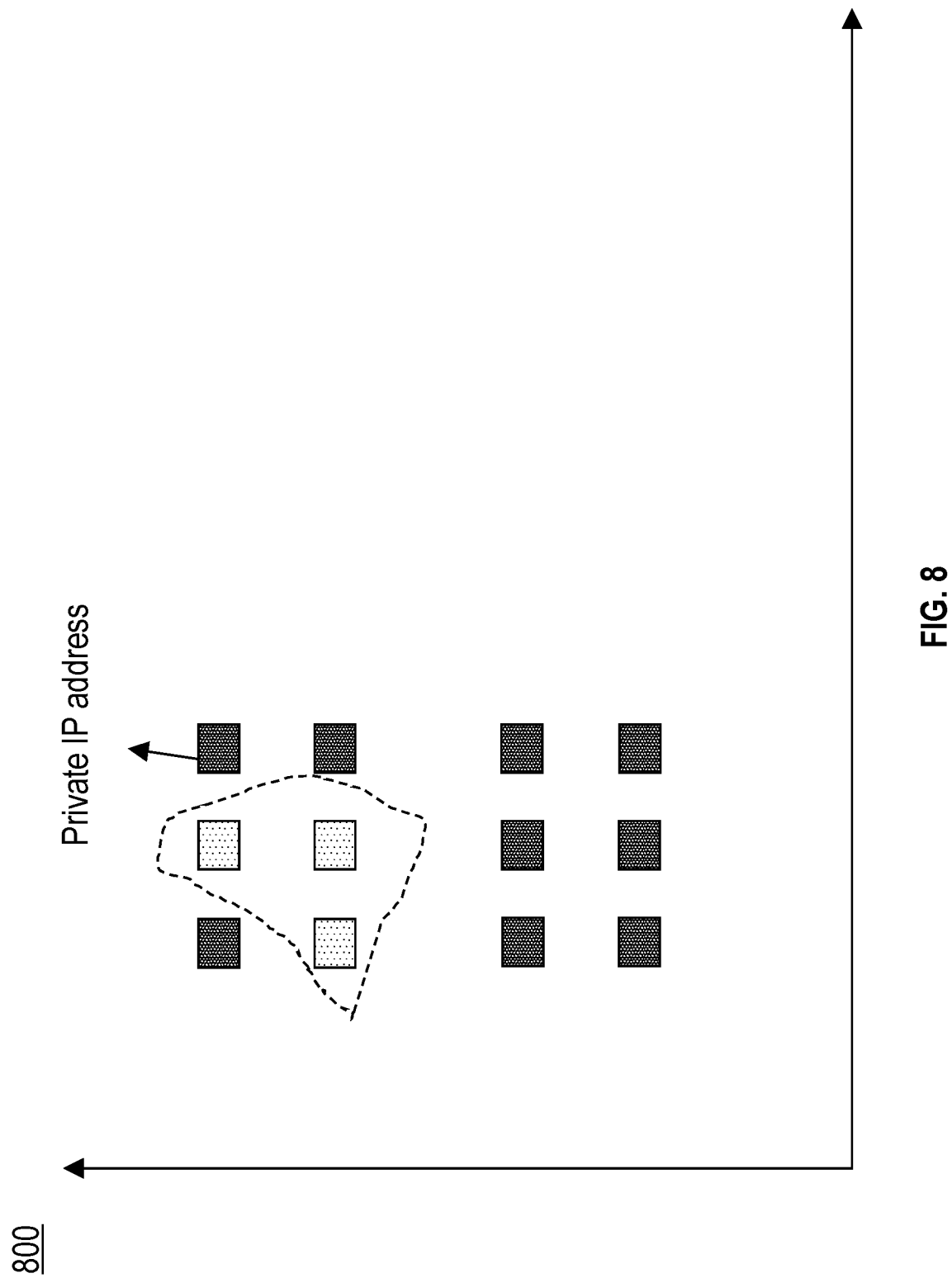

In certain embodiments, the risk scores of the users can be associated with the network metadata (e.g., network IP information). In some embodiments, one or more of the clustering features can be used to determine (e.g., determine by the user risk profiler engine 316 and/or the network space predictor 412) clusters of users of one or more levels of riskiness in the network environment. For example, a clustering approach (e.g., a nearest neighbor (NN) approach and/or other clustering approaches), as shown in FIGS. 7-8, can be applied to (or performed on) one or more clustering features associated with a plurality of users of a level of riskiness (e.g., to determine the clusters/groups of users). In one example, at least one clustering approach (e.g., k-means clustering, mean-shift clustering, density-based spatial clustering of applications with noise (DBSCAN), expectation-maximization (EM) clustering using Gaussian mixture models (GMM), and/or agglomerative hierarchical clustering) can be applied to the clustering features. In certain embodiments, a number of clustering features to be considered (or used) in the clustering approach can be defined, configured, or otherwise specified via a parameter. A final subset of clustering features to be used for the final clustering can be determined by a sub-system, as determined by the subset of features that optimizes a clustering termination criterion, for example. The outcome of the clustering process can be used to determine a network space (e.g., determined by a network space predictor 412). In certain embodiments, one or more parameters can be used (e.g. used by the network space predictor 412) to limit and/or restrict a size of a contiguous address space that forms the network space. In one example, one or more parameters may be used to preconfigure and/or define a particular number of network spaces to be determined, according to levels of riskiness.

Referring now to FIG. 4, a user may interact with a network environment via a client 102. The client 102 may include or correspond to a device of a consumer of the service. For example, if the consumer is an individual or user, the client 102 may comprise a smartphone, a laptop (e.g., at home), a tablet device, and a desktop computer (e.g., at work), that the user may use to access an application resource (e.g., Dropbox service) and/or other resources at various times and/or locations for instance. In certain embodiments, the client 102 can produce and/or generate one or more events corresponding to (or describing) an activity of user. The client 102 may send, transmit, or otherwise provide said event(s) to an analytics service (e.g., an analytics service comprising a network space predictor 412, user risk profiler engine 316 and/or an action trigger engine 318). In some embodiments, the one or more events can include or correspond to one or more user attributes, such as a user name, a name of a customer, a device identification (e.g., device ID), an operating system of the client 102 (e.g., client OS), time, public IP information, private IP information, and/or other attributes. In some embodiments, the client 102 may include or correspond to a remote user or a user from a private network (e.g., a corporate private network). In certain embodiments, the type of information (e.g., the event(s)) provided by a client 102 connected to a public network and a client 102 from a private network can be the same. However, the action trigger engine 318 and/or the user risk profiler engine 316 may correlate information (e.g., a plurality of features) on additional dimensions for clients 102 connected to a private network (as compared to clients 102 connected to a public network).

In some embodiments, the one or more events generated by the client(s) 102 can be collected in an event hub. As part of the extract, transform, load (ETL) layer 420, the public IP information (e.g., public network information) may be enriched by using location information, such as city information, country information, latitude information, longitude information, and/or other types of location information. In certain embodiments, the enriched information (e.g., public IP information and/or location information) can be stored and/or maintained in a data lake 312 (or other databases).

In some embodiments, the user risk profiler engine 316 may obtain and/or receive the data stored in data lake 312, the analytics data (e.g., historical information) stored in an analytics database 414, and/or the external threat data stored in an external threat database 416. As such, the user risk profiler engine 316 may use (e.g., correlate) the data from data lake 312, the analytics data, and/or the external threat data to generate and/or determine risk indicators/scores for the users of the network environment (e.g., according to machine learning and/or statistical approaches). In some embodiments, the external threat data may include or correspond to a list or set of one or more malicious IP addresses. The list or set of malicious IP addresses can be organized according to one or more malicious categories, such as windows exploits, web attacks, phishing, botnets, denial of service, scanners, proxies, reputation, spam sources, and/or mobile threats. The list or set of malicious IP addresses can be determined by continuously monitoring in-use IPv4 and/or IPv6 addresses.

In certain embodiments, the network space predictor 412 can use a plurality of clustering features to generate a network space comprising a cluster of network locations. In one example, the clustering features may include or correspond to the risk indicators (e.g., risk scores of the users determined by the user risk profiler engine 316), the analytics data and/or the external threat data. In some embodiments, the network space predictor 412 may correlate the clustering features to determine the network space. To determine the network space, the network space predictor 412 can use a subset of the clustering features (e.g. one or more of the analytics data, the external threat data, the user activity data, the network metadata, the risk indicators/scores of the uses, and/or the network performance data) and/or other features. For example, the network space predictor 412 can determine a network space according to network performance data, such as a network performance score.

In some embodiments, the action trigger engine 318 may perform at least one mitigation action on the subset of users 422 corresponding to the determined network space (e.g., the determined network space associated with a deteriorating network performance, such as threat network subnet 426), according to the risk indicators/scores determined by the user risk profiler engine 316. In certain embodiments, the relationship/association between the user and network information can be queried/determined according to the following relations: 1) user and corresponding public IP and private IP information, and/or 2) network address space and corresponding users-IP information, similar to what is shown by user and network relationships 424. In some embodiments, the action trigger engine 318 may use the network space and/or the user-IP relationship(s) to apply and/or perform a mitigation action on a subset of users corresponding to the derived network space. Performing the mitigation action comprises at least one of: analyzing a threat associated with the subset of users, applying at least one policy to the subset of users, performing an audit on the subset of users, logging off subset of users, or recording sessions of subset of users. The client manager 418 may execute, perform and/or apply the mitigation action(s) on the client(s) 102, to effectively or preemptively address the threat/risk in the network environment.

Figure 5:
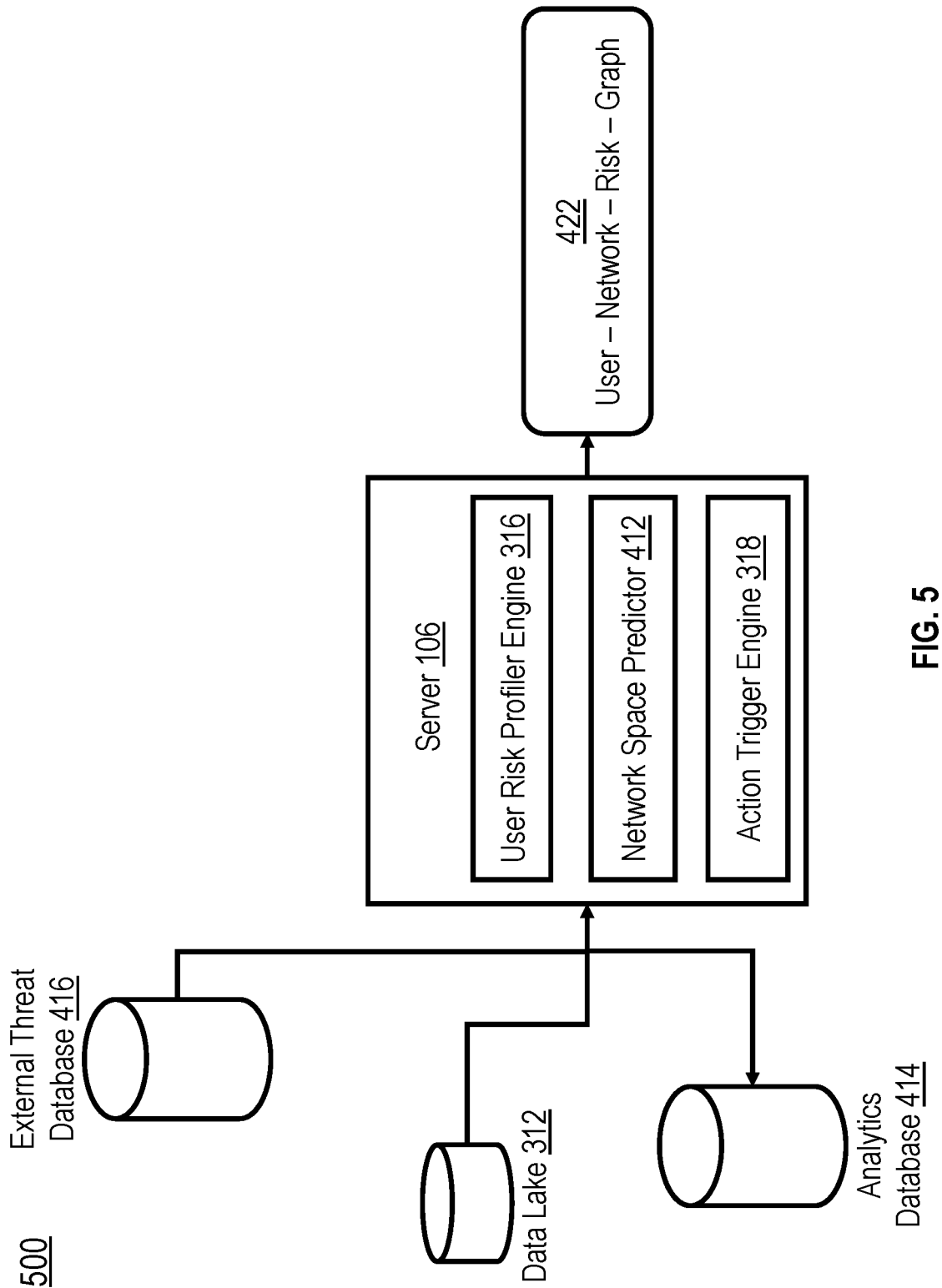

Referring to FIG. 5, depicted is a block diagram of one example embodiment of a system 500 for performing at least one mitigation action on a subset of users of at least a defined level of riskiness. The system 500 may include the user risk profiler engine 316, the network space predictor 412 and/or the action trigger engine 318. The user risk profiler engine 316, the network space predictor 412, the external threat database 416, the analytics database 414, the data lake 312, and/or the action trigger engine 318 can include one or more features associated with the user risk profiler engine 316, the network space predictor 412, the external threat database 416, the analytics database 414, the data lake 312, and/or the action trigger engine 318 discussed in connection with FIGS. 3-4 for instance. In certain embodiments, the system 500 can be implemented in a server 106. The server 106 can include or maintain or have access to an analytics service. In certain embodiments, the user risk profiler engine 316 may determine a plurality of users of one or more levels of riskiness in a network environment. The user risk profiler engine 316 can also determine network locations of the plurality of users. In some embodiments, the network space predictor 412 may use a plurality of clustering features (e.g., stored/maintained in the external threat database 416 and/or analytics database 414, and/or determined by the user risk profiler engine 316) to generate a network space. In certain embodiments, the action trigger engine 318 can perform at least one mitigation action on a subset of users 422 corresponding to the generated network space.

The system 600 may include one or more servers 106. In some embodiments, the server 106 may execute, provide, provision, and/or host one or more network application(s). In some embodiments, a service/resource may be referred to interchangeably with an application, application resource or network application. An application can for instance include a remote-hosted application, a remote-hosted desktop, a web application or a software-as-a-service (SaaS) application. A remote-hosted desktop may be a virtual desktop hosted on a server 106 which is accessed by or remotely provisioned to the client 102. In some embodiments, the delivery of a remote-hosted desktop may be via a session and/or connection based on High-Definition User Experience (HDX) or Independent Computing Architecture (ICA) display remoting protocol, or Remote Desktop Protocol (RDP). A remote-hosted application may include/correspond to an application service that can be delivered via a HDX-based, ICA-based, RDP-based, etc., session and/or connection. In some embodiments, a remote-hosted application may be an application which is installed on/in the remote-hosted desktop environment and is therefore accessible within the remote-hosted desktop. A SaaS application can be a centrally-hosted application which is typically accessible on a subscription basis. In some embodiments, the SaaS applications may include web-based applications. In other embodiments, the SaaS applications may correspond to remote-hosted applications and, therefore, can be delivered in HDX/ICA/RDP— based sessions and/or connections. SaaS applications and/or web applications may include for instance salesforce.com, SAP, Microsoft Office 365, Dropbox or Gmail service, Amazon web services, and so on.

In some embodiments, the server 106 can be part of a cloud or datacenter for instance. The server 106 may include any embodiment of volatile memory 122 or non-volatile memory 128 (discussed in FIG. 1C for example) which may store files, data and/or content of the service. The server 106 may communicate with other various components of the system 600 in FIG. 3 via a communications interface 118 for instance. Hence, the server 106 may be similar in some aspects to the computer 101 described with reference to FIG. 1C.

Public Network Space

Figure 6:
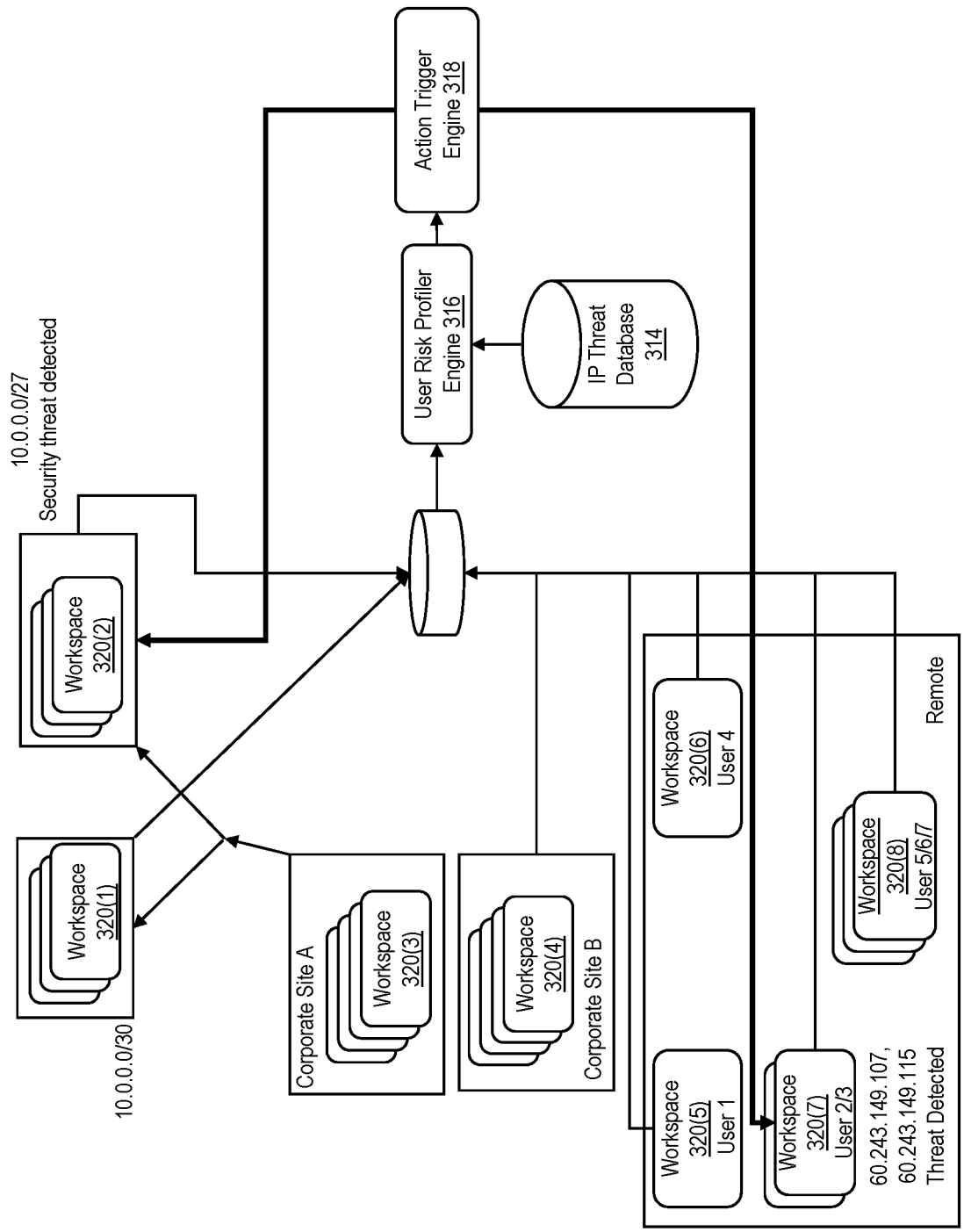
FIG. 6 is a block diagram of a system for performing a mitigation action on users in private and/or public networks, in accordance with an illustrative embodiment.

Referring to FIG. 6, the group of remote users can be associated with user activity from a public network space. An example representation of a public network space is depicted in FIG. 7. In one example, user 2 and user 3 of FIG. 6 are potentially breached, and as such, the analytics service may identify user 2 and user 3 as having an increased level of riskiness. Therefore, the user risk profiler engine 316 and/or the network space predictor 412 may generate and/or determine a network space comprising the network locations of user 2 and user 3 as corresponding to 60.243.149.115/27 (or other addresses). The action trigger engine 318 may use the network space information to perform at least one mitigation action on user 2 and user 3. As such, the holistic security threat analysis can be carried out for both users (e.g., user 2 and user 3), instead of carrying out (or performing) a threat analysis for user 2 and 3 separately in silos.

Private Network Space

In the case of medium to large private networks (e.g., corporate networks), a similar level of granular control can be provided. An example representation of a private network is depicted in FIG. 8. In one example, the user risk profiler engine 316 may use historical private IP information (e.g., in addition to the above described correlated features for a public network access) to generate a private IP network space (e.g., a private network space being potentially exploited). As such, a corporate team can perform one or more mitigation actions on a small group of users to isolate and/or analyze a particular threat.

In FIG. 6, for instance, sub site 2 of corporate site A may have potential malicious/risky users. The network space predictor 412 may generate and/or determine a network space based on the identified risky users, wherein the network space can include the network locations of sub site 2 (and/or even extend to sub site 1), to include the exploited/risky users. A machine learning model approach, for example, can be used to determine the network space, wherein a security perimeter is adjusted based on current data, historical data and/or analytics data. In this manner, security administrators can perform security monitoring, security threat isolation, and/or elimination of possible exploited users, therefore allowing business operations to continue as is on secure perimeters outside of the potentially exploited network space.

Proximity of IP Addresses

In certain embodiments, an IP address which appears to be close in IP address space to one or more IP addresses of high risk (e.g., in terms of security threats) can be risky as well. The intuition behind said association in levels of riskiness of IP addresses is that a usage and administration (e.g., running mostly recent or old software, regularly patched or unpatched software, well-configured or misconfigured software, etc.) of hosts having IP addresses in close proximity is quite common, and therefore, similar security properties are applied over said hosts. In one example, known risky IP addresses can be grouped and/or clustered in an IP address space. In another example, the IP addresses of a network address space can be from a same location, based on carriers and a range of a network.

In certain embodiments, the systems and methods discussed herein are applicable in view of the increasing rate of adoption of IPv6 spaces and addresses. Certain vendors, such as threat intelligence vendors, are embracing the proliferation of IPv6, and as such, have started to provide similar metadata in IPv6 as in IPv4. Both the IPv4 and the IPv6 specifications may define private IP address ranges. The private IP addresses can be used for local area networks (LANs) in residential, office, and/or enterprise environments. In certain embodiments, the transition from IPv4 to IPv6 may continue to take place relatively slowly, as operators and ISPs gradually deploy IPv6 across their networks. In the foreseeable future, IPv4 and IPv6 may have to coexist in a same network environment, by leveraging protocol tunneling, a dual-stack, and/or IPv4-to-IPv6 translation technology. Based on the above, the systems and methods described herein can be extended and/or applied to IPv6 addresses. As such, any instances of "IP address(es)" described herein can refer to IPv4 addresses and/or IPv6 addresses.

Figure 9:
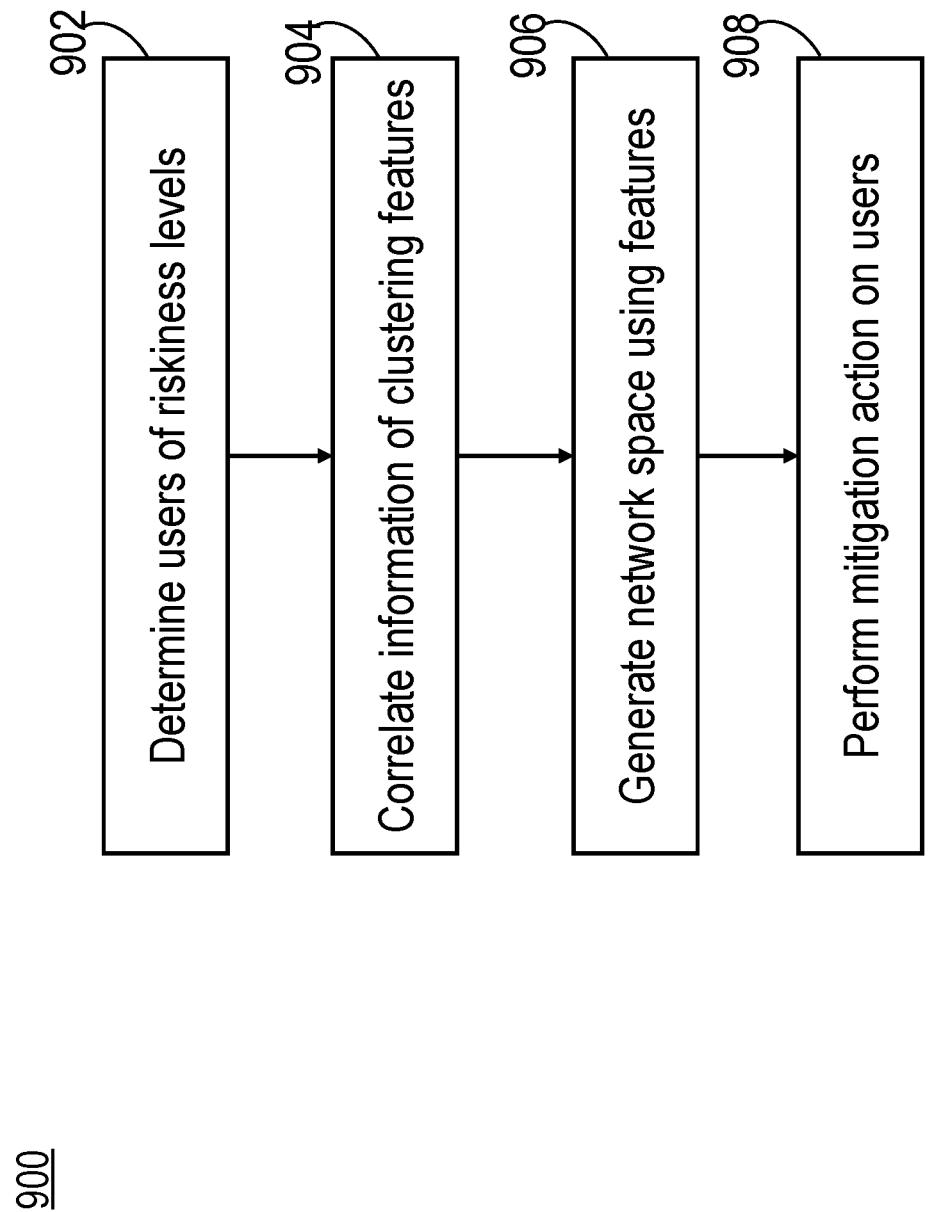
FIG. 9 is a flow diagram of an example method for performing a mitigation action on a subset of users of at least a defined level of riskiness, in accordance with an illustrative embodiment.

Referring to FIG. 9, depicted is a flow diagram of one embodiment of a method 900 for generating a network space comprising one or more users to perform mitigation actions. The functionalities of the method 900 may be implemented using, or performed by, the components detailed herein in connection with FIGS. 1-6. In brief overview, at least one server 106 may determine users of one or more levels of riskiness (902). The at least one server 106 may correlate information of clustering features (904). The at least one server 106 may generate a network space using clustering features (906). The at least one server 106 may perform a mitigation action on users (908).

Referring now to operation (902), and in some embodiments, at least one server 106 may determine and/or identify a plurality of users in a network environment (e.g., a private network environment and/or a public network environment). The plurality of users can be of one or more levels of riskiness. In some embodiments, a level of riskiness can be defined and/or characterized according to a plurality of levels (e.g., a first level, a second level, a third level and/or other levels). In one example, a first level of riskiness may indicate that the user does not represent an imminent security threat to the network environment. A second level of riskiness, for instance, may specify that the user is likely to be a malicious entity (and/or is vulnerable to an attack), and therefore, the security of the network environment may be compromised. In another example, a third level of riskiness can indicate that the user is a malicious entity (and/or is highly vulnerable to an attack by a malicious entity), such that one or more security attacks have been performed (e.g., by the user) within the network environment. In certain embodiments, the at least one server 106 may determine the network locations (e.g., IP addresses and/or other information associated with a network locations) of the plurality of users.

Referring now to operation (904), and in some embodiments, the server(s) 106 may correlate or otherwise compare information from at least some of a plurality of clustering features. In one example, the at least one server 106 may correlate information stored in a data lake 312, an analytics database 414, an external threat database 416, and/or other clustering features. The user risk profiler engine 316 of the at least one server 106 may correlate the information from the plurality of clustering features to determine risk indicators (e.g., risk scores) of users of the network environment. The generated risk indicators may be used to determine whether a user is likely to be (or impacted/targeted by) a malicious entity (e.g., a level of riskiness of the user). In some embodiments, the correlation can be performed via machine learning approaches and/or other approaches. In some embodiments, the plurality of clustering features may include at least one of: analytics data, external threat data, user activity data, network metadata, risk scores of the users, or network performance data. The external threat data may include or correspond to external metadata (e.g., external databases) from outside the network environment. For instance, one or more third parties can provide metadata for characterizing an IP reputation. The external metadata can be used to enrich any data internal to the network environment, such as the analytics data.

In some embodiments, the plurality of clustering features may include information on geographic location (e.g., of one or more users). For instance, the plurality of clustering features may include a geographic location when at least some of the users are in a public network. In a private network space, for example, geolocation information of the user(s) can be irrelevant in determining a network space. In certain embodiments, the network metadata (e.g., IP metadata) includes information of at least one of: a private network (e.g., a private IP network), a public network (e.g., a public IP network), an internet service provider, a reputation and/or location. Said information can be associated with (or related to) at least one of the plurality of users. In one example, information of a private network associated with at least one user, information of an internet service provider associated with at least one user, information of a location associated with at least one user (e.g., a country, city, latitude, longitude and/or other information), information of an IP reputation associated with at least one user, external data, analytics data, and/or other clustering features can be used to determine/generate a network space. In certain embodiments, the information of the location of at least one user may include at least one of: a country, a city, a region, a longitude, a latitude, a geographic indicator, a network address, a subnet identifier, and/or an internet protocol address.

Referring now to operation (906), and in some embodiments, the server(s) 106 may use the plurality of clustering features to generate, create, define, and/or determine a network space. For instance, the network space predictor 412 of the server(s) 106 can use generated risk indicators, analytics data (e.g., stored in the analytics database 414), external threat data (e.g., maintained in the external threat database 416) and/or other features to determine a network space. The network space may comprise a cluster and/or group of network locations (e.g., private/public IP addresses) corresponding to a subset of users of the plurality of users. The subset of users can have or be of at least of a defined level (e.g., a first level, a second level, and/or other levels) of riskiness. As such, the network space can be a network address that groups and/or clusters users of a network environment that are determined to have a defined level of riskiness. In some embodiments, the network space can be generated according to a clustering approach, such as NN clustering and/or other types of clustering approaches. The outcome of the clustering approach can be the generated network space.

In certain embodiments, the network space predictor 412, for instance, may limit and/or restrict a size, extent, and/or range of a contiguous address space that forms the network space. As such, the network space predictor 412 may determine the smallest possible (contiguous) address space that groups and/or includes the maximum possible amount of users of at least a defined level of riskiness (e.g., to create a targeted network space, rather than a broad or distributed network space). In some embodiments, the at least one server 106 (e.g., the network space predictor 412) may generate a plurality of network spaces. The plurality of network spaces may correspond to (or be associated with) subsets of users. The subsets of users can be of different levels of riskiness. In one example, a first network space (e.g. generated using clustering features) can include users of at least a first level of riskiness, while a second network space (e.g., generated using clustering features) may include users of at least a second level of riskiness.

Referring now to operation (908), and in some embodiments, the server(s) 106 may perform a mitigation action on the subset of users (e.g., of a defined level of riskiness) corresponding to the generated network space. For example, the network space predictor 412 of the server(s) 106 can generate a network space. Based on the generated network space, the action trigger engine 318 may apply or otherwise perform at least mitigation action on the users clustered, grouped, and/or identified by the generated network space. As such, the action trigger engine 318 may use the generated network space to determine the subset of users to which the mitigation action(s) are applied to. In certain embodiments, performing the mitigation action may comprise at least one of: analyzing a threat associated with the subset of users, applying at least one policy to the subset of users, performing an audit on the subset of users, logging off subset of users, and/or recording sessions of subset of users. In one example, and responsive to generating a network space, an action trigger engine 318 may logoff the subset of users corresponding to the network space. By performing at least one mitigation action (e.g., by engaging with or removing one or more users associated with a defined level of riskiness), the server(s) 106 can reduce a level of risk (e.g., security risk) and/or eliminate a threat (e.g., a security threat) of the network environment, thereby increasing the safety of the network environment.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method comprising:
    determining, by at least one server, a plurality of users of one or more levels of riskiness in a network environment, and network locations of the users;
    generating, by the at least one server using a plurality of clustering features and using a network space predictor, a network space comprising a cluster of network locations corresponding to a subset of the users of at least a defined level of riskiness, wherein the network space predictor generates metadata corresponding to the cluster of network locations that is used to define the network space; and
    performing, by the at least one server, a mitigation action on the subset of users corresponding to the generated network space, wherein the mitigation action comprises at least one of: performing an audit on the subset of users or logging off the subset of users.

2. The method of claim 1, comprising limiting, by the at least one server, a size of a contiguous address space that forms the network space.

3. The method of claim 1, comprising generating, by the at least one server, a plurality of network spaces corresponding to subsets of users of different levels of riskiness.

4. The method of claim 1, wherein the plurality of clustering features includes at least one of: analytics data, external threat data, user activity data, network metadata, risk scores of the users, or network performance data.

5. The method of claim 4, wherein the network metadata includes information of at least one of: a private network, a public network, an internet service provider, reputation or location, associated with at least one of the users.

6. The method of claim 5, wherein the information of the location includes at least one of: a country, a city, a region, a longitude, a latitude, a geographic indicator, a network address, a subnet identifier, or an internet protocol address.

7. The method of claim 1, wherein performing the mitigation action further comprises at least one of: analyzing a threat associated with the subset of users, applying at least one policy to the subset of users, or recording sessions of subset of users.

8. The method of claim 1, comprising correlating, by the at least one server, information from at least some of the plurality of clustering features.

9. The method of claim 1, wherein when at least some of the users are in public network space, the plurality of clustering features includes information on geographic location.

10. A system comprising:
    at least one processor configured to:
    determine a plurality of users of one or more levels of riskiness in a network environment, and network locations of the users;
    generate, using a plurality of clustering features and using a network space predictor, a network space comprising a cluster of network locations corresponding to a subset of the users of at least a defined level of riskiness, wherein the network space predictor generates metadata corresponding to the cluster of network locations that is used to define the network space; and
    perform a mitigation action on the subset of users corresponding to the generated network space, wherein the mitigation action comprises at least one of: performing an audit on the subset of users or logging off the subset of users.

11. The system of claim 10, wherein the at least one processor is configured to limit a size of a contiguous address space that forms the network space.

12. The system of claim 10, wherein the at least one processor is configured to generate a plurality of network spaces corresponding to subsets of users of different levels of riskiness.

13. The system of claim 10, wherein the plurality of clustering features includes at least one of: analytics data, external threat data, user activity data, network metadata, risk scores of the users, or network performance data.

14. The system of claim 13, wherein the network metadata includes information on at least one of: a private network, a public network, an internet service provider, reputation or location, associated with at least one of the users.

15. The system of claim 14, wherein the information of the location includes at least one of: a country, a city, a region, a longitude, a latitude, a geographic indicator, a network address, a subnet identifier, or an internet protocol address.

16. The system of claim 1, wherein the mitigation action includes at least one of: analyzing a threat associated with the subset of users, applying at least one policy to the subset of users, or recording sessions of subset of users.

17. The system of claim 1, wherein the at least one processor is configured to correlate information from at least some of the plurality of clustering features.

18. The system of claim 1, wherein when at least some of the users are in public network space, the plurality of clustering features includes information on geographic location.

19. A non-transitory computer readable medium storing program instructions for causing at least one processor to:

determine a plurality of users of one or more levels of riskiness in a network environment, and network locations of the users;

generate, using a plurality of clustering features and using a network space predictor, a network space comprising a cluster of network locations corresponding to a subset of the users of at least a defined level of riskiness, wherein the network space predictor generates metadata corresponding to the cluster of network locations that is used to determine the network space; and perform a mitigation action on the subset of users corresponding to the generated network space, wherein the mitigation action comprises at least one of: performing an audit on the subset of users or logging off the subset of users.

20. The non-transitory computer readable medium of claim 19, wherein the plurality of clustering features includes at least one of: analytics data, external threat data, user activity data, network metadata, risk scores of the users, or network performance data.

* * * * *